March 14, 1961 R. N. RHODES 2,975,231

DELAYED ACTION COLOR KILLER AND AUTOMATIC CHROMA CONTROL CIRCUIT

Filed June 1, 1956 2 Sheets-Sheet 1

INVENTOR.
ROLAND N. RHODES
BY
ATTORNEY

March 14, 1961 R. N. RHODES 2,975,231

DELAYED ACTION COLOR KILLER AND AUTOMATIC CHROMA CONTROL CIRCUIT

Filed June 1, 1956 2 Sheets-Sheet 2

INVENTOR.
ROLAND N. RHODES
BY [signature]
ATTORNEY

United States Patent Office 2,975,231

Patented Mar. 14, 1961

2,975,231

DELAYED ACTION COLOR KILLER AND AUTOMATIC CHROMA CONTROL CIRCUIT

Roland N. Rhodes, Levittown, Pa., assignor to Radio Corporation of America, a corporation of Delaware Filed June 1, 1956, Ser. No. 588,664

19 Claims. (Cl. 178—5.4)

The present invention relates to improvements in color television receiving systems and more particularly to color television receiving systems of the type suited for transducing both color type television signals and monochrome type television signals into corresponding color and monochrome television images.

In the commercial practice of compatible color television broadcast and reception according to present F.C.C. color standards, it has been found desirable to provide means, in the home color television receiver for disabling the color function of the home receiver during reception of standard monochrome television signals. In accordance with present television standards governing the broadcast of color and monochrome television signals, the broadcast color television signal is very similar in character to the standard monochrome television signal. From a simplified point of view, the standard color television signal is a standard monochrome television signal which has added to it a color subcarrier component and a color synchronizing burst component. The color subcarrier component communicates color hue and saturation information relating to picture information which is essentially monochrome in character. The color synchronizing burst component is transmitted to afford means for reconstructing at the receiver a subcarrier signal by which synchronous demodulation of the color carrier may be carried out. The burst component is, therefore, transmitted by a television station only during periods when color picture information is being broadcast.

It is, therefore, the present practice in some color television receiver designs to provide means for sensing the presence or absence of the color burst component of a color television signal. If the burst component is present, automatic means fully condition the receiver for proper demodulation of the color subcarrier and the reproduction of a color television image. Absence of a color burst component in the received color television signal, of course indicates that a monochrome television signal is being received. Under these conditions, the color function of the receiver is automatically disabled so that noise disturbances are not visibly accentuated by varied color reproduction. Such prior art arrangements have generally included means which makes conversion of the receiver from that condition permitting color reproduction to that condition premitting only monochrome reproduction, dependent upon reduction of the burst component to a value below a predetermined level. This level of burst has been termed the "kill level" of the receiver. The term "kill" refers to the disabling action which is imposed on the color signal processing section of the receiver once the received burst level falls below the critical "kill" amplitude.

In these prior art systems, a rather serious condition of color killer instability occurs when the received burst amplitude falls within a signal amplitude range immediately bracketing the "kill" level since then, small variations in signal strenth will cause random cycling of the receiver conditioning between that condition permitting color reception and that condition permitting monochrome reception.

The present invention overcomes the above problem by providing a novel color killer system for a compatible color television receiver in which the level of received color burst component required to condition the receiver for color reception is substantially above that level of color burst signal below which the receiver is conditioned for monochrome signal reception. This produces a "latch" effect which prevents instability. This may be carried out in a number of ways depending upon the particular characteristics of the color television receiver.

In one form of the present invention, the chroma amplifier of a two channel color television receiver is automatically disabled whenever the amplitude of the received color burst component falls below a predetermined level. Means are provided at the output of the chroma amplifier for sampling the burst component of received color signals applied to the input of the chroma amplifier. Means are further provided for periodically keying the chroma amplifier on during brief periods of its disablement in a manner causing sampling of signals applied to the chroma amplifier to determine if a burst component is present. In accordance with the present invention, means are additionally provided for reducing the maximum effective gain of the chroma channel during the particular "keyed-on" intervals so that a higher level of color burst component will be required to recondition the receiver for color reception than that level below which the receiver was conditioned for monochrome reception, thereby providing the aforementioned electrical "latch" effect.

In another aspect of the present invention, a novel amplifier circuit is provided for accomplishing the dual function of developing an automatic chroma control voltage for a color television receiver as well as a color killer circuit having the aforementioned "latch" characteristic.

A more complete understanding of the present invention will be obtained through a reading of the following specification, especially when taken in connection with the acompanying drawings in which.

Figure 1:
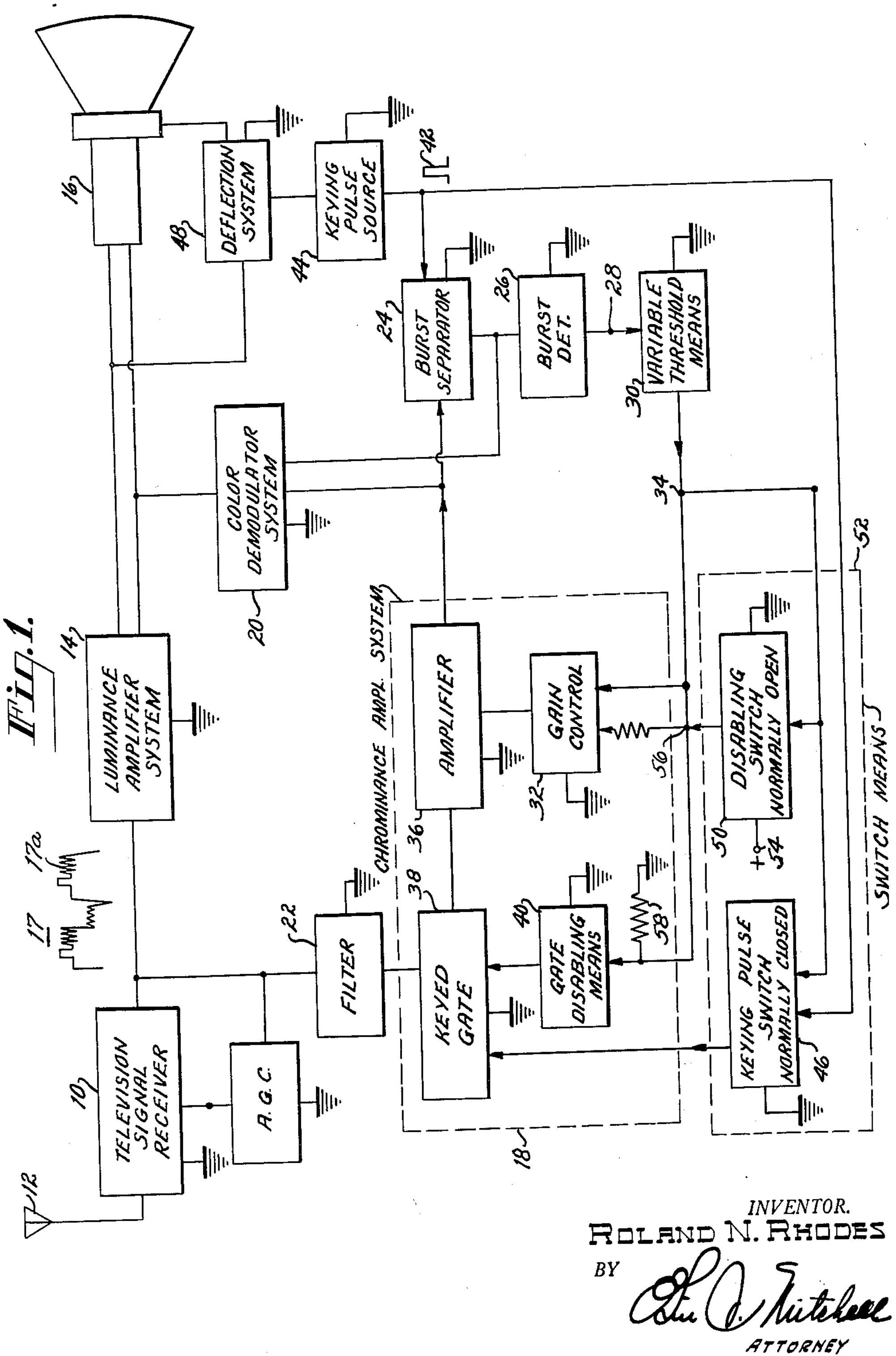
Figure 1 is a block diagram representation of a color television receiving system embodying the novel features of the present invention.

In Figure 1, there is shown at 10 a television signal receiver suitable for receiving and demodulating both monochrome type and compatible color type television signals. The receiver 10 is supplied with received signals by the antenna 12. By way of example, the general form of the color receiver shown in Figure 1 is of the two channel variety in which a luminance amplifier system 14 is directly connected between the output of the television receiver 10 and the input of a color image display device 16. Color video signal is shown at 17 with the conventional burst component at 17*a*. In substantially parallel connection with the luminance amplifier system 14 is a chrominance amplifier system shown in the dotted line area 18. The chrominance amplifier system 18 forms part of a chrominance channel which extends from the output of the television receiver 10 to the output of a well known color demodulator system shown at 20. The color demodulator 20 is also provided with color burst information supplied by the burst separator 24 which itself samples the output signal of the chrominance amplifier system 18. The chrominance amplifier system 18 is, therefore, seen to be operatively coupled with the receiver means for amplifying both the chrominance component and burst components of color type signals. The filter 22 prevents the lower frequency luminance and monochrome components of demodulated video signals from reaching the chrominance amplifier system. In this way, only the color subcarrier and burst components are delivered to the chrominance amplifier system. Connected with the output of the aforementioned burst separator 24 is the input circuit of a burst detector 26. The amplitude of burst delivered by the burst separator is effectively rectified by the burst detector 26 to develop an automatic chroma control potential which appears at terminal 28.

In accordance with the particular form of the present invention being considered, a variable threshold means 30 is supplied for coupling the rectified burst appearing at terminal 28 to the gain control apparatus shown at 32. The purpose of this variable threshold device will be apparent as the specification proceeds. Whenever the rectified burst produces a voltage in excess of that value established by threshold means 30, a voltage will appear at terminal 34, the magnitude or amplitude of which is a substantially continuous function of the amplitude of the received burst component. This voltage may be used for automatic chroma control in a manner well known in the art and for this reason is often termed an "automatic control voltage."

In accordance with conventional practice, the automatic gain control voltage appearing at terminal 34 acts upon the gain control apparatus 32 to control the gain of the amplifier 36 such as to maintain the output of the chrominance amplifier 18 substantially constant over wide ranges of variation in the amplitude of the received burst component. In further accordance with prior art practice, a keyed gate means 38 is provided which acts as coupling means between the output of the filter 22 and the input of the amplifier 36. By its nature as a keyed gate, the gate 38, unless disabled, will block passage of electrical signals except during periods defined by an applied keying pulse. The gate 38 has associated with it a gate disabling means 40 which operates to conditionally disable the gate 38, thereby making it continuously conductive so as to permit passage of signals to the amplifier 36 independently of the keying pulses. During the intervals in which the gate 38 is to be keyed, keying pulses 42 are derived from a keying pulse source 44. The source 44 is operatively coupled through a switch means 46 to the keyed gate 38. If the keyed gate 38 is disabled by the action of disabling means 40, the keying pulses 42 are unnecessary and the switch 46 may be opened to discontinue their application to the gate 38. Since the pulses 42 are synchronously related through the deflection system 48 to the horizontal synchronizing component of the received television signal, and hence the burst component of received color signals, the keying signals 42 will normally cause the chrominance amplifier system to be turned on and "look-for" the presence of a burst component in the received signal.

In accordance with the present invention, a disabling switch 50 is associated with the keying pulse switch 46 for controlling the variable threshold means 30 as well as the gate disabling means 40. As discussed more fully hereinafter, switch means 50 also may be caused to influence the gain of amplifier 36 by acting upon the gain control apparatus 32. For simplicity, the switches 46 and 50 may be combined as indicated by the dotted line area 52 and considered as a single switch means responsive to the automatic chroma control potential delivered by the threshold means 30 to control the various functions coupled with the switch means 46 and 50.

In considering the operation of the arrangement shown in Figure 1 and the other embodiments of the present invention discussed throughout this specification, the term "normal" will be construed as applying to that set of conditions during which either a monochrome signal is being received or the amplitude of received burst in a color signal is insufficient to permit good color picture reproduction. Specifically, consider the arrangement of Figure 1 during reception of a monochrome signal. Under these conditions, the burst separator 24 will deliver no signal to the burst detector 26 and no automatic chroma control (ACC) voltage will appear at either terminal 28 or 34. Terminal 34 is connected with the control inputs to the switches 46 and 50. The disabling switch 50, in the arrangement of Figure 1, may be considered as a normally open switch so that in the absence of AGC voltage the potential appearing at the output terminal 56 of the switch 50 will remain substantially ground potential by virtue of the resistor 58. The gate disabling means 40 (normally effective, that is, in the absence of an actuating voltage at terminal 56) will, therefore, not be actuated and the keyed gate 38 will act as a keyed gate means. As brought out above, the keying pulses 42 will be communicated through the normally closed switch 46 to the keyed gate 38 to effectuate its keying action. Under these conditions, the only signals that can reach the burst separator 24 from the output of the television receiver 10, will be those signals occurring during a period in which the burst component of a color television signal would appear if a color television signal were applied to the receiver.

Therefore, let it now be assumed that the character of television transmission received by the receiver 10 changes from monochrome to color reception. Under these conditions, the keyed gate 38 will pass a color burst component to the burst separator 24 which in turn will be rectified by the burst detector 26. An output voltage will appear at terminal 28 which will be applied to the threshold means 30. If the amplitude of the brust component is sufficiently high, the threshold means 30 will pass this voltage to terminal 34. Immediately the switch means 50 will be actuated and the keying pulse switch 46 will be opened and the disabling switch 50 will be closed. Upon closing of the switch 50, the positive potential appearing at terminal 54 will be communicated to the gate disabling means 40 to disable the keyed gate 38 and render it continuously conductive of applied signal. Simultaneously, the keying pulse switch 46, upon opening, will remove the now unnecessary keying pulses 42 from application to the keyed gate 38. Should the amplitude of the burst component increase due to changes in the radio transmission conditions between the transmitter and receiver, the potential at terminal 34 will increase and the gain control means 32 will act to decrease the gain of the amplifier 36 in typical automatic chroma control fashion.

In accordance with one novel feature of the present invention, it will be noted that upon the receipt of a color burst component, the variable threshold means 30 is supplied with a positive potential from terminal 54 through the action of the switch 50. This, in accordance with the present invention, is caused to change that value of the potential developed by the burst detector 26 required to first cause a change in the potential at terminal 34. In one preferred form of the invention, the variable threshold means 30 will be conditioned to increase the level of burst required to increase the potential at terminal 34. Further, in accordance with one form of the present invention, the gain control means 32 is also, through the action of switch 50, supplied with a positive potential upon the receipt of a burst component. This is caused to increase the maximum gain that the amplifier 36 is capable of providing. It will, therefore, be seen that in accordance with the present invention, the level to which the burst component of a color television signal must fall before the switch means 52 are actuated to condition the receiver for monochrome reception, will be substantially lower than that level of burst component required to initially actuate the switch means 50 for conditioning the receiver for color reception. It will further be appreciated that during those intervals in which the switch means 50 is effective to render the keyed gate 38 operative (thereby keying out all but the burst component of the received signal), the positive potential applied to the gain control means 32 via switch 50 will be discontinued and the maximum gain of the amplifier system 18 will be reduced so that during the keyed-on interval of the amplifier system 18, the overall system gain will be limited. This novel feature of applicant's invention insures that a greater amplitude of color signal and attendant color burst component is required to condition the receiver for color reception than that level of received signal and burst component below which the receiver is conditioned for monochrome reception.

Figures 2, 3:
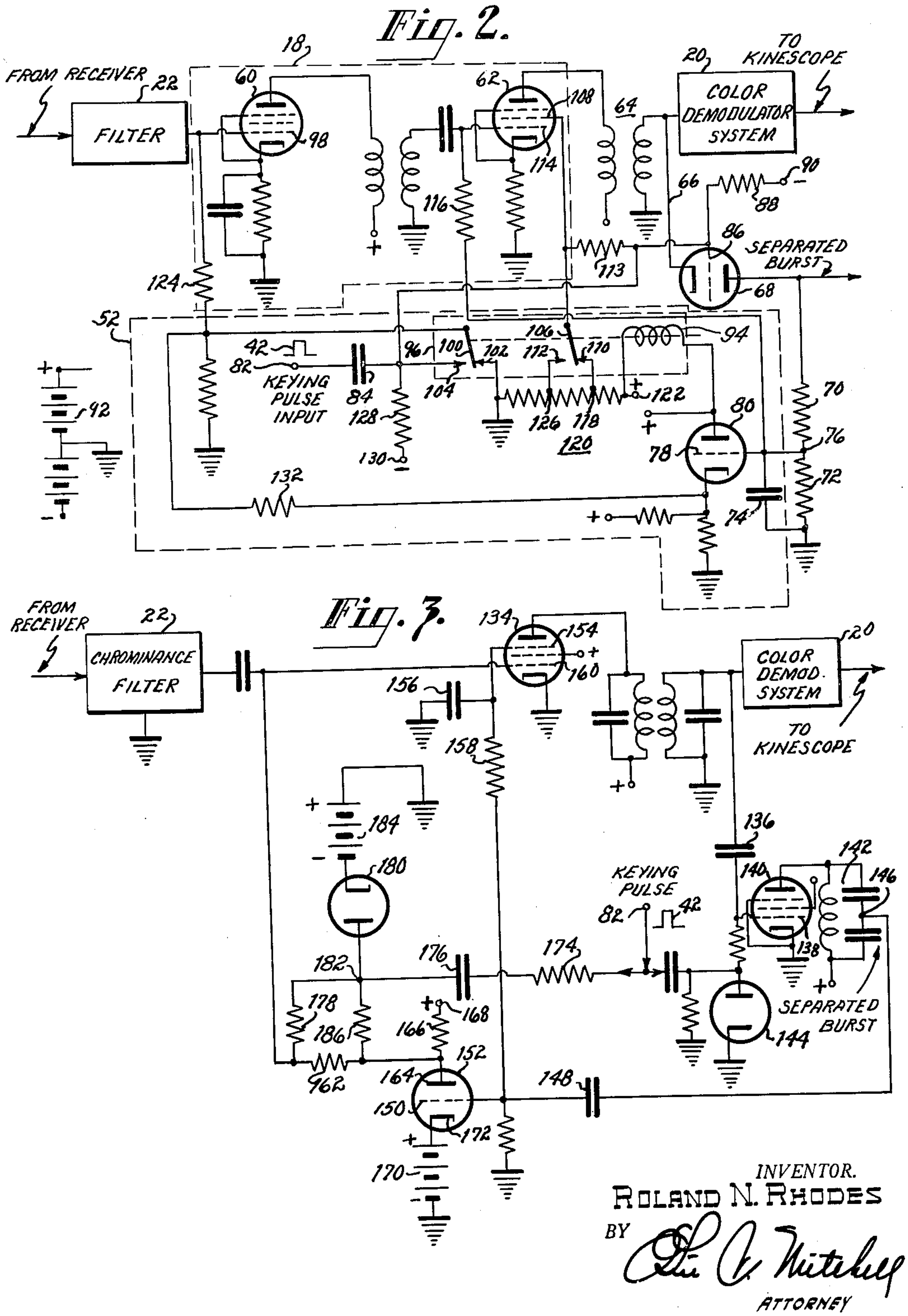
Figure 2 is a combination block and schematic representation of one form of the present invention as applied to a color television receiver.
Figure 3 is a combination block and schematic representation of still another form of the present invention as it may be embodied in a color television receiver.

In Figure 2, there is shown one way of carrying out the present invention utilizing an electromechanical relay which is actuated to condition the receiver for color or monochrome signal reception. The output signal from the filter 22, also shown in Figure 1, is applied to a gated amplifier tube 60, the output signal from which is conventionally coupled to a chroma amplifier tube 62. Output signal from the amplifier 62 is coupled via transformer 64 to the color demodulator system 20 also discussed in Figure 1. Output signal from the chroma amplifier 62 is applied via lead 66 to the cathode of a burst separator tube 68. The anode of the burst separator tube 68 is connected to ground through load resistors 70 and 72. Capacitor 74 is connected in shunt with load resistor 72. The junction 76 between resistors 70 and 72 is direct current connected to the control electrode 78 of a color killer tube 80. Keying pulses 42 described in Figure 1 are applied to terminal 82 and are coupled via capacitor 84 to the control electrode 86 of the burst separator 68. The control electrode 86 is also connected through an input resistor 88 to a source of negative bias potential 90. A power supply source, not shown, provides positive and negative power supply potentials suitable for the operation of the circuit now being described.

The anode of the color killer tube 80 is connected with the winding 94 of an electromechanical relay shown in the dotted line area 96. The relay is shown in an unenergized condition; that is, under the conditions when insufficient anode current is flowing from tube 80 to actuate the relay. The control electrode 98 of the amplifier 60 is connected to the armature 100 of relay 96. Armature 100 is situated to selectively form circuit connections with either the contact 102 or the contact 104. Armature 106 of relay 96, on the other hand, is connected with the screen electrode 108 of the amplifier 62. Armature 106 is situated to make circuit connection with either contact 110 or contact 112. It will also be noted that a resistor 113 is connected from the armature 96 to the control electrode 86 of the burst separator 68. The control electrode 114 of the amplifier 62 is connected through resistor 116 to the terminal 76 of the burst separator.

In considering the operation of the arrangement shown in Figure 2, it will be most convenient to assume that a compatible color television signal is being received. Under these conditions, the keying pulses 42 will condition the burst separator tube 68 for conduction during the time interval in which color burst information is being received. The value of the negative bias applied to tube 68 is established in part by means of the potential at terminal 90 so that the tube 68 is nonconducting even during the keying pulse interval unless burst component is present in the received signal. As brought out hereinbefore, the keying pulses 42 are timed to occur during the burst interval in accordance with well known color television receiver techniques. The keying pulses 42 are generally derived from the horizontal deflection circuit of the television receiver. Since a burst component is being received, the burst separator tube 68 will be rendered conductive during the burst interval to deliver separated burst at the upper terminal of resistor 70. Moreover, the average anode current flow through tube 68 will develop a negative potential at terminal 76 of a value which will maintain the tube 80 in a state of nonconduction. The cathode of tube 80 is shown, by way of example, as having additional biasing means in its cathode circuit for imposing a fixed negative grid-cathode bias on the tube if desired. In the operation of the embodiment shown in Figure 2, with no anode current flowing through tube 80, the relay 96 will be unenergized and in the swtiching condition shown in Figure 2. Accordingly, the armature 106 will be in closed circuit relation with the contact 110 which is in turn connected to a point 118 on a bleeder resistor 120. Bleeder resistor 120 is connected from a positive potential source 122 to circuit ground. In this way, a suitable positive screen potential will be applied to the screen electrode 108 of tube 62. Similarly, armature 100 will be in closed circuit relation with contact 102. Contact 102 is shown connected with circuit ground so that control electrode 98 of tube 60 will have applied to it only signal delivered by the filter 22. Resistor 124 will act as a conventional input resistor for tube 60.

In accordance with the present invention, should the level of received color signal drop sufficiently or the received signal change in character to that of a standard monochrome television signal, the negative voltage at terminal 76 of the burst separator will become less in magnitude. The grid-cathode bias on tube 80 will become more positive, thereby permitting anode current conduction in the tube and energizing the relay 96. Armatures 100 and 106 will then become in closed circuit relation to contacts 104 and 112 respectively. Since contact 112 is connected to terminal 126 on the voltage divider resistor 120, the positive voltage applied to the screen electrode 108 of tube 62 will become less positive in value. By this means, the gain of the amplifier 62 will be reduced. Also the reduction in screen potential resulting from the actuation of relay 96 will, through the agency of resistor 113, result in an increase in the negative bias applied to the burst separator control electrode 86. As described more fully hereinafter, this tends to increase the threshold on the separator burst tube 68. Concomitantly, the lower terminal of the input resistor 124 for amplifier 60 will be connected to contact 104 of the relay. Contact 104 is connected through resistor 128 to a source of negative potential 130. The magnitude of the potential 130 is sufficient to establish cut-off in tube 60 and thereby prevent chrominance signal from passing through the amplifier. However, also appearing at terminal 104 will be the keying pulses 42 extending in a positive going direction with respect to circuit ground. The amplitude of the keying pulse 42 is so adjusted to not only separate the burst separator 68 mentioned above, but also to overcome the bias on tube 60 and hence drive the tube into anode current conduction. Amplifier 60 will then become a keyed gate which passes electrical signals only during the interval of the keying pulses 42. In this way, the present invention effectively disables the chrominance amplifier system 18 by rendering it incapable of communicating chrominance signal information. The output of the color demodulator system 20 will, therefore, drop to zero and the kinescope connected therewith will not be productive of color information. On the other hand, the keying pulses 42 will condition the chrominance amplifier system to pass color burst information to the burst separator 68 to that when a burst component of sufficient amplitude to render tube 80 again conductive is received, this burst component will be passed to the burst separator.

In further accordance with the novel features of the present invention, it will be realized that a greater amplitude of received burst will be necessary to condition the receiver for color picture reception than that amplitude of burst component below which the receiver was conditioned for monochrome reception. This comes about by virtue of the aforementioned reduction in gain of the chrominance amplifier system during its conditioning for monochrome signal reception, this being accomplished by the control exercised on the screen electrode potential of tube 62. Thus, an electrical "latch" effect is produced in which the circuit requires a greater amplitude of received burst component to change the conditioning of the receiver from monochrome to color reception than that amplitude of received burst during color reception below which receiver conditioning will change from color reception to monochrome reception.

It should be appreciated that the present invention provides additional advantage not hereinbefore mentioned. This advantage is based on the observed fact that a lower value of signal to noise ratio may be tolerated in a color television signal display than in a monochrome television signal display. Consequently, it is desirable in a color television receiver having a color killer system to permit color television reception under conditions of much lower signal to noise ratio than could otherwise be tolerated in a monochrome reception. It will also be seen from a study of the arrangement in Figure 2 that an automatic chroma control action is also provided by connecting the lower terminal of resistor 116 to the lower terminal 76 of the burst separator. Resistor 116, therefore, communicates the negative voltage developed at terminal 76 to the grid of amplifier 62 so that should the amplitude of received burst component increase due to selective transmission characteristics in the radio link between the transmitter and receiver, the negative voltage at terminal 76 will become more negative and properly reduce the overall gain of the chrominance amplifier system 18. As mentioned hereinabove, a resistor 113 is connected from the armature 106 of relay 96 to the control electrode 86 of the burst separator tube 68. The use of this resistor is optional in the present invention. Its effect, however, is to enhance the latch effect described hereinabove inasmuch as during monochrome reception the threshold on the burst separator 68 is caused to increase. This means that a greater amplitude of received burst is required to condition the receiver for color reception than would otherwise be the case were the resistor 113 not employed. Resistor 113 and its connections constitute means for changing the threshold of the burst separator on a color television receiver in accordance with automatic chroma control information and in response to the conditioning of the receiver for either color television signal reception or monochrome television signal reception. Additional means such as resistor 132 may be employed from the armature 100 of relay 96 to the cathode of the color killer tube 80. With such means, the net grid to cathode bias on the color killer tube will become more positive during monochrome reception and consequently, result in the requirement of a greater amplitude of received color burst in order to condition the receiver for color signal reception. It will further be understood that all resistance values employed in connection with the power supply bleeder resistor 120 as well as resistors 113 and 132 are valued to prevent undesired degrees of degeneration in the automatic chroma control circuit operation and undesired amounts of pulse component on the cathode of tube 80. These latter considerations of course apply only in the event that resistors 113 and 132 are employed. Resistor 132 and its connections to other circuit components constitute means for adjusting the threshold of color killing action in a color television receiver color killer circuit as a function of the conditioning of said receiver for either monochrome or color television signal reception.

In the arrangement of Figure 3, the output of the chrominance filter 22 is applied to a conditionally keyed chroma amplifier tube 134. Output signal from the chroma amplifier 134 is coupled in a conventional fashion to a color demodulator circuit 20 as described hereinbefore. The output of the chroma amplifier 134 is capacitively coupled via capacitor 136 to the control electrode 138 of a keyed burst separator tube 140. Tube 140 has connected in its anode output circuit a resonant circuit 142 tuned to the frequency of the standard color television burst component. Keying pulses 42 applied to terminal 82 are capacitively coupled to the control electrode 138 of the burst separator 140. By this means, the burst separator 140 is keyed on only during those intervals in which color burst component is expected. The diode 144 comprises clamping means for the keying pulse 42 while cut-off bias for the tube 140 is developed by rectification of the keying pulses. The separated burst which appears at terminal 146 is in turn coupled via capacitor 148 to the control electrode 150 of a color killer tube 152. The suppressor electrode 154 of the chrominance amplifier 134 is connected through time constant network comprising capacitor 156 in shunt with resistor 158 to the control electrode 150 of the color killer tube.

In Figure 3, the control electrode 160 of the chrominance amplifier 134 is connected through resistor 162 to the anode 164 of the color killer tube 152. A load resistor 166 is connected from the anode of a color killer tube to a positive power supply terminal 168. For purposes of illustrational simplicity, no power supply source has been indicated in Figure 3. It will be understood that a negative terminal of the power supply source whose positive terminal is indicated at 168, will be connected with circuit ground. A source of positive potential 170 is shown connected between the cathode 172 of the color killer tube and circuit ground. The value of the negative grid-cathode bias supplied by the source 170 is sufficient to maintain the tube 152 in a state of safe current conduction under the conditions of monochrome signal reception as will hereinafter be made clear. Keying pulses for the purposes of conditionally keying the chroma amplifier 134 are coupled via resistor 174 and capacitor 176 and resistor 178 to the control electrode 160 of the chroma amplifier 134. A diode 180 is connected from the junction 182 of capacitor 176 and resistor 178 to circuit ground. A suitable source of negative bias potential 184 has been shown connected between the cathode of the diode 180 and circuit ground. A resistor 186 is also connected from the anode of the diode 180 to the anode 164 of the color killer tube 152.

In explaining the operation of the embodiment of the present invention shown in Figure 3, it will be convenient to first consider the conditions prevailing during the reception of a color television signal having a substantial amplitude of burst component. Under these conditions, the separated burst appearing at the output of the burst separator 140 will be applied to the control electrode 150 of the color killer tube 152. The burst amplitude is sufficient to cause grid-cathode current conduction in tube 152. Due to this grid-cathode conduction, the separated burst will in effect be rectified and produce a negative charge potential on capacitor 148 which will appear at the control electrode 150. Circuit potentials and values are so arranged that the magnitude of the negative voltage developed at the control electrode 150 is, during the reception of a substantial amplitude of color signal, sufficient to result in anode current cut-off of the color killer tube 152. During anode current cut-off of the tube 152, the potential at the anode 164 will rise to a value substantially equal to the positive potential terminal 168. Under these conditions, the diode 180 will tend to become heavily conductive and present a low impedance between the terminal 182 and circuit ground. During this heavy conduction of diode 180, the potential at 182 will be substantially equal to that potential produced at the cathode of the diode due to the action of the power supply source 184. The potential at 182 is thus established so that the potential at the control electrode 160 of the amplifier 134 is sufficiently negative with respect to circuit ground to provide for linear operation of the amplifier 134. Moreover, the low impedance presented by the diode 180 will severely attenuate the keying pulses 42 which in the absence of diode 180 would appear at the control electrode 160 of tube 134.

Should the amplitude of the received burst signal drop to a sufficiently low amplitude or the receiver be tuned to a monochrome type television signal, the rectification of burst signal depended upon to maintain cut-off in the tube 152 will no longer occur. As the value of the potential at electrode 150 decreases to a sufficiently low negative value, the color killer tube 152 will commence conduction. This will produce anode current flow in the color killer tube 152. Anode current flow through load resistor 166 will cause the potential of the anode 164 to become less positive and conduction through the diode 180 will decrease. The effective resistance of the diode 180 as conduction current through it decreases is increased, thus permitting a greater amplitude of keying pulse to appear at the terminal 182. Simultaneously, as the potential of the anode 164 becomes less positive, the control electrode bias on tube 134 becomes more negative, thus reducing the gain of the chrominance amplifier 134. If a burst component is being received at this time, its amplitude as applied to the color killer tube control electrode 150 will be correspondingly reduced to enhance the speed with which the color killer tube acts to "kill" the chroma amplifier 134.

The actual "kill" of the chroma amplifier is effectuated by the development of a highly negative voltage on the control electrode 160 of tube 134. This highly negative voltage, or disabling voltage, is developed through the process of grid-cathode rectification of the keying pulses 42 which, as mentioned above, are permitted to reach the control electrode 160 during conduction of the color killer tube 152. This rectification of the keying pulses 42 will require that the control electrode 160 be driven into a positive relation with respect to the cathode of tube 134. During conduction between the control electrode and cathode of tube 134, the effective gain of the chroma amplifier to burst signal will be reduced on two accounts. First, the effective input resistance of tube 134 during control electrode current conduction will be reduced to a value tending to attenuate any burst component that appears at the output of the chrominance filter 22. Second, during control electrode current conduction the amplitude of the burst component will have to swing sufficiently negative into the transfer characteristic of the tube 134 to produce an output signal of sufficient magnitude for separation by the burst separator 140. Thus, the controlled application of keying pulses taken in connection with the establishment of proper operating bias for the tube 134 constitutes means for reducing the effective gain of the chrominance amplifier during its "keyed-on" intervals. By this mechanism, a greater amplitude of burst from the receiver will be necessary to condition the receiver for color reception from a "monochrome condition" than that amplitude of burst at which the color killer tube 152 is allowed to conduct and "kill" the receiver for color reception.

Having described my invention, what is claimed is:

1. In a color television and monochrome television receiver for receiving, demodulating and transducing either a standard broadcast color television signal into a visible color television image or a standard monochrome television signal into a visible monochrome television image, said color television signal being characterized by the inclusion therein of a chrominance component and a periodically recurrent burst component, the combination of: means for receiving broadcast television signals of the types described; an amplifier operatively coupled with said receiving means for amplifying signal frequencies corresponding to the burst and chrominance components of received color television signals; means operatively coupled to the output of said amplifier for developing a direct current control voltage representing the amplitude of the burst component of received color television signals; signal responsive means operatively coupled with said control voltage developing means and said amplifier for disabling said amplifier conditionally upon the amplitude of said burst component falling below a first minimum threshold; means operatively coupled with said amplifier for periodically enabling said amplifier by overcoming the influence of said disabling means concurrently with the actuation of said disabling means, the timing and periodicity of said periodic enabling action being made substantially synchronous with the burst component of the received color television signal so that during activation of said disabling means said amplifier is effectively keyed to permit continued passage of only said burst component to said direct current control voltage developing means; and means operatively coupled with said disabling means and periodic enabling means for inactivating said disabling means and periodic enabling means whenever the amplitude of said burst component increases to a second minimum threshold value susbtantially above said first minimum threshold value.

2. In a compatible color and monochrome television receiver for receiving, demodulating and transducing either a standard broadcast color television signal into a visible color television image or a standard monochrome television signal into a visible monochrome television image, said color television signal being characterized by the inclusion therein of a line deflection synchronizing component, chrominance component and a periodically recurrent burst component of fixed duration and relation to said line deflection synchronizing component, the combination of: means for receiving broadcast television signals of the types described; a keyable amplifier system operatively coupled with said receiving means for amplifying signal frequencies corresponding to the burst and chrominance components of received color television signals; means operatively coupled with the output of amplifier system for developing a direct current control voltage representing the amplitude of the burst component of received color television signals; signal responsive means operatively coupled with said control voltage developing means and said amplifier system for conditionally disabling said amplifier system only upon the amplitude of said burst component falling below a first minimum threshold; a keying signal generator productive of periodically recurrent keying signals each having a duration substantially equal to the duration of said burst component; means operatively coupling said generator to said receiving means to synchronize said generator in accordance with received television signal information so as to render said keying signals synchronously timed with respect to said line deflection synchronizing component and further timed to occur during intervals in which color burst component is received; signal responsive control means operatively coupling said keying signal generator to said amplifier system upon actuation of said control means so as to periodically overcome by said keying signals the influence of said disabling means on said amplifier system; means operatively coupling said control means to said control voltage developing means for actuating said control means only upon actuation of said disabling means so that said amplifier system is at all times conditioned to pass received color burst components; and means operatively coupled with said amplifier system and said disabling means for reducing the effective gain of said amplifier system during its keyed intervals to a value sufficiently low so that said disabling means is inactivated only upon said burst component reaching a second amplitude threshold level substantially above said first minimum threshold.

3. In a color television receiver for receiving and transducing standard television signals of both the monochrome and color types into visible color television images, said color type signals being distinguished from said monochrome type signals by the inclusion therein of a periodically recurrent color synchronizing burst component and color information component, the combination of: a luminance channel means for processing signal components representing brightness variations in the color image represented by received color television signals and for also processing received monochrome television signals; a chrominance channel means for processing those portions of received color television signals corresponding to said color information component and said burst component; means operatively included in said receiver and responsive to received signals for developing a direct current control voltage, the magnitude of which is a substantially continuous function of the amplitude of color synchronizing burst component during the reception of color television signals; means operatively coupled with said chrominance channel means and said control voltage developing means for disabling said chrominance channel means upon a reduction in the magnitude of said control voltage below a first discrete minimum level; and means operatively included in said receiver and responsive to said control voltage for effectuating the enabling of said chrominance channel only upon the increase in the magnitude of said control voltage to a second discrete minimum level, said second level so that the chrominance channel means of said discrete minimum level being fixedly established at a substantially higher magnitude than said first discrete level so that the chrominance channel means of said receiver is enabled only in response to an amplitude level of received color burst component which is substantially higher than that level of received color burst component at which said chrominance channel means is disabled.

4. In a color television receiver for receiving and transducing standard television signals of both the monochrome and color types into visible color television images, said color type signals being distinguished from said monochrome type signals by the inclusion therein of a periodically recurrent color synchronizing burst component and color information component, the combination of: a luminance channel means for processing signal components representing brightness variations in the color image represented by received color television signals and for also processing received monochrome television signals; a chrominance channel means for processing those portions of received color television signals corresponding to said color information component and said burst component; means operatively included in said receiver and responsive to received signals for developing a direct current control voltage, the magnitude of which is a substantially continuous function of the amplitude of color synchronizing burst component during the reception of color television signals; means operatively coupled with said chrominance channel means and said control voltage developing means for disabling said chrominance channel means upon the development by said control voltage developing means of a control voltage corresponding to a first discrete minimum level of received burst component; and means operatively included in said receiver and responsive to said control voltage for effectuating the enabling of said chrominance channel only upon the change in the magnitude of said control voltage to a value corresponding to a second discreet minimum level of received burst component, said second discrete minimum level being fixedly established at a substantially higher magnitude than said first discrete level so that the chrominance channel means of said receiver is enabled only in response to an amplitude level of received color burst component which is substantially higher than that level of received color burst component at which said chrominance channel means is disabled.

5. In a color television receiver for receiving and transducing standard radio broadcast television signals of both the monochrome and color type into respective monochrome and color television images, said color type television signals being distinguished from said monochrome type television signals by the inclusion therein of a color burst component, the combination of: receiving means for receiving and detecting said standard broadcast radio television signals; means operatively coupled with said receiving means to transduce detected signals into a visible television image; control voltage responsive means operatively included in said last named means conditioning said receiver in response to an applied control voltage to produce either a color type image display or a monochrome type image display; means operatively included in said receiver responsive to the amplitude of the burst component of received color television signals to develop a control voltage, the magnitude of which is a substantially continuous function of the amplitude of received burst component over a given range of burst amplitude levels; means operatively applying said control voltage to said conditioning means; a first threshold means operatively coupled with said conditioning means to effectuate conditioning of said receiver for color type image display only upon the receipt of color type television signals having a burst component of an amplitude above a first discrete level; a second threshold means operatively coupled with said conditioning means to effectuate conditioning of said receiver for monochrome type image display only upon the receipt of television signals having no burst component of an amplitude above a second discrete level, said second discrete level being established at a lower amplitude level than said first discrete level so that during the color image display of the color type television signals the level of received burst component must fall substantially below said first discrete level before conditioning of said receiver for monochrome image display is caused.

6. In a color television receiver for receiving and transducing standard radio broadcast television signals of both the monochrome and color types into visible color television images of the monochrome color type, said color type television signal being distinguished from said monochrome type television signals by the inclusion therein of a periodically recurrent burst component and a color information component, the combination of: receiving means for receiving and detecting said broadcast television signals to produce a video signal which during reception of a color type television signal includes a luminance, chrominance and burst component; a luminance channel means operatively coupled with said receiving means for processing both monochrome video signals and the luminance component of color type video signals; a chrominance channel means operatively coupled with said receiving means for processing the chrominance and burst components of color type video signals; means operatively coupled with said chrominance channel for separating said burst component from chrominance component signals after being processed through at least a portion of said chrominance channel means, said chrominance channel means having a predetermined maximum signal gain; burst detecting means operatively coupled with the output of said separating means for developing a control voltage the amplitude of which is substantially a continuous function of the amplitude of the burst component delivered by said separating means; means operatively coupled with said chrominance channel means and said control voltage developing means for conditionally disabling said chrominance channel, said disabling means being activated by the application thereto of a control voltage whose magnitude is at or on one side of a discrete disabling threshold, and inactivated by the application thereto of a control voltage, the magnitude of which is on the other side of said disabling threshold, said receiver being thereby expressly conditioned for monochrome television signal reception only during actuation of said disabling means and color type television reception during inactivation of said disabling means; means operatively coupled to said receiving means and responsive to video signals supplied thereby to develop keying signals synchronously related to the periodicity of said burst component; means operatively applying said keying signals to said chrominance channel with such electrical sense as to periodically overcome the disabling influence of said disabling means during the activation of said disabling means so that said chrominance channel means, while disabled, is permitted to deliver burst component signals to said separating means; and means operatively coupled with said chrominance channel means and said burst detecting means for reducing the maximum signal gain of said chrominance channel during those intervals in which both said disabling means is activated and said keying signals are effective to overcome the disabling influence of said disabling means so that for a given amplitude of received burst component, the amplitude of separated burst is less during activation of said disabling means than during its inactivation, whereby said receiver is conditioned for monochrome type television signal reception for received burst component amplitudes substantially below that amplitude of burst component required to condition said receiver for color type television signal reception.

7. In a color television receiver for receiving and transducing standard radio broadcast television signals of both the monochrome and color types into visible color television images of the monochrome color type, said color type television signal being distinguished from said monochrome type television signals by the inclusion therein of a periodically recurrent burst component and a color information component, the combination of: receiving means for receiving and detecting said broadcast television signals to produce a video signal which during reception of a color type television signal includes a luminance, chrominance and burst component; a luminance channel means operatively coupled with said receiving means for processing both monochrome video signals and the luminance component of color type video signals; a controllable gain chrominance channel means operatively coupled with said receiving means for processing the chrominance and burst components of color type video signals; means operatively coupled with said chrominance channel for separating said burst component from chrominance component signals after being processed through at least a gain controlled portion of said chrominance channel means; burst detecting means operatively coupled with the output of said separating means for developing a control voltage, the amplitude of which is a function of the amplitude of the burst component delivered by said separating means; disabling means operatively coupled with said chrominance channel means and said control voltage developing means for disabling said chrominance channel means in response to developed control voltage of a given threshold magnitude and enabling said chrominance channel for control voltage values beyond said given threshold magnitude such that said chrominance channel is disabled only when receiving television signals not having a burst amplitude above a predetermined minimum value; means operatively coupled to said receiving means and responsive to video signals supplied thereby to develop keying signals synchronously related to periods in which the burst component of color television signals is received; means applying said keying signals to said chrominance channel during disablement thereof so as to overcome the influence of said disabling means during the discrete periods in which said burst component is received; and gain control means operatively coupled with said chrominance channel and said control voltage developing means establishing a different level of gain in said chrominance channel during keyed intervals thereof than at other times exists in said chrominance channel.

8. In a color television receiver for receiving and transducing standard radio broadcast television signals of both the monochrome and color types into visible color television images of the monochrome color type, said color type television signal being distinguished from said monochrome type television signals by the inclusion therein of a periodically recurrent burst component and a color information component, the combination of: receiving means for receiving and detecting said broadcast television signals to produce a video signal which during reception of a color type television signal includes a luminance, chrominance and burst component; a luminance channel means operatively coupled with said receiving means for processing both monochrome video signals and the luminance component of color type video signals; a chrominance channel means operatively coupled with said receiving means for processing the chrominance and burst components of color type video signals; means operatively coupled with said chrominance channel for separating said burst component from chrominance component signals after being processed through at least a portion of said chrominance channel means, said chrominance channel means having a predetermined maximum signal gain; an amplifier device having at least a first and a second direct current voltage responsive gain controlling electrodes; means operatively including said amplifier device in said chrominance channel for controlling at least the gain of said portion of said chrominance channel means by varying the direct current voltage on either of said gain controlling electrodes; burst detecting means operatively coupled with the output of said separating means for developing a control voltage the amplitude of which is substantially a continuous function of the amplitude of the burst component delivered by said separating means; means operatively applying said control voltage to the first of said gain controlling electrodes with such electrical sense as to provide an automatic chroma control action in said receiver; means operatively coupled with said burst detecting means to produce a disabling voltage for said amplifier device whenever the amplitude of received burst component falls below a predetermined minimum level; means operatively applying said disabling voltage in gain reducing relation to said second gain control electrode so when in sufficient magnitude the gain of said amplifier is reduced to a degree disabling said chrominance channel means; means operatively coupled to said receiving means and responsive to video signals supplied thereby to develop keying signals synchronously related to the periodicity of said burst component; and control means responsive to developed control voltage for applying said keying signals to said second gain controlling electrode in such electrical sense and with such amplitude as to key said amplifier into an increased gain condition thereby periodically enabling said chrominance channel means in response to said keying signals.

9. In a color television receiver for receiving and transducing standard radio broadcast television signals of both the monochrome and color types into visible color television images of the monochrome color type, said color type television signal being distinguished from said monochrome type television signals by the inclusion therein of a periodically recurrent burst component and a color information component, the combination of: receiving means for receiving and detecting said broadcast television signals to produce a video signal which during reception of a color type television signal includes a luminance, chrominance and burst component; a luminance channel means operatively coupled with said receiving means for processing both monochrome video signals and the luminance component of color type video signals; a chrominance channel means operatively coupled with said receiving means for processing the chrominance and burst components of color type video signals; means operatively coupled with said chrominance channel for separating said burst component from chrominance component signals after being processed through at least a portion of said chrominance channel means; a vacuum tube amplifier device having at least a first and second direct current voltage responsive gain control electrodes and at least a cathode electrode; means operatively including said amplifier device in said chrominance channel for controlling at least the gain of the said portion of said chrominance channel means; burst rectifying means operatively coupled with the output of said separating means for developing a first direct current control voltage representing the amplitude of received burst component; means operatively applying said first control voltage to said first electrode in automatic chroma control relation thereto; means responsive to said first control voltage and including threshold apparatus to develop a second control voltage only upon the condition of said first control voltage reaching a value corresponding to a discrete minimum amplitude of received burst component; means operatively coupling said second control voltage to said second control electrode in an electrical sense reducing the gain of said chrominance channel means to a value preventing useful color image reproduction by said receiver; a source of keying signal synchronously related to those time periods during which burst component is received during a color television transmission; a voltage responsive attenuating means operatively coupling said keying signal source with said second control electrode for conditionally applying keying signals thereto; and means operatively applying said second control voltage to said attenuating means to effectuate application of keying signals to said second control electrode during reception of signals having no burst component above said minimum amplitude.

10. In a color television receiver having a chroma channel means adapted for conditional disablement by a disabling voltage during monochrome signal reception and gain control by an automatic chroma control voltage during color reception, a combination circuit for developing a disabling voltage for said chroma channel and an automatic chroma control voltage for said chroma channel comprising in combination; a chroma channel means having a disabling voltage input terminal and an automatic chroma control voltage input terminal; a circuit ground against which elements of said receiver are electrically referenced; means referenced to said ground separating the color burst component from received standard color television signals; vacuum tube having at least an anode, cathode and control electrode; a resistor galvanically connected between said control electrode and said cathode; means establishing said cathode at substantially the same alternating current potential as said circuit ground; a capacitor connected between said control electrode and said burst separating means for applying said separated burst to said control electrode; bias means operatively connected with said control electrode and cathode for imposing a net negative bias on said control electrode so as to oppose current flow in said vacuum tube between said control electrode and cathode; a source of anode power supply for said vacuum tube, said source having a positive potential terminal and a negative potential terminal, said negative potential terminal being established at said circuit ground; resistance means connected between said positive potential terminal and said anode to form an output load circuit for said vacuum tube; galvanically conducting coupling means connected from said load circuit to said disabling voltage input terminal means; and galvanically conducting coupling means connected from said control electrode to said automatic chroma control voltage input terminal means for delivering thereto a potential developed on said control electrode as an automatic chroma control voltage, said bias means being so adjusted that for amplitudes of received burst component in excess of a predetermined minimum, said burst component is rectified by conduction between said control electrode and cathode to produce an additional negative bias on said control electrode sufficient to prevent current conduction in said output circuit during periods other than those defined by said burst component.

11. In a color television receiver for receiving standard color television signals of both the color type and monochrome type, the combination of: a circuit ground means against which elements of said receiver as hereinafter defined are electrically referenced; a chrominance channel means having an automatic chroma control voltage acceptance terminal and a disabling voltage acceptance terminal, the gain of said chrominance channel means being directly controllable by the magnitude of voltage applied to either of said input terminals; burst separating means operatively connected with the output of said chroma channel means for separating from received standard color television signals the standard synchronizing burst component; means operatively coupled with said burst separating means for rectifying separated burst components to produce a control voltage; means operatively coupling said control voltage to said automatic chroma control terminal means for imposing an automatic chroma control action on said chrominance channel means; means responsive to said developed control voltage to produce a direct current disabling voltage upon the change of said control voltage to a value corresponding to an amplitude of received burst component falling below a predetermined minimum level; means operatively coupling said direct current disabling voltage to said disabling voltage terminal means; a source of keying signal for said chroma channel means, said keying signal being synchronized in accordance with received television signals to occur during those periods of time in which burst component is expected during standard color television signal reception; a resistor and diode connected in series with one another to form a combination; means direct current coupling the extremities of the resistance-diode combination across the disabling voltage applied to said disabling terminal, one extremity of said diode being galvanically connected to circuit ground; and means operatively applying said keying signal across said diode to apply keying pulses through said resistor to said disabling terminal such that the amplitude of keying signal appearing at said disabling terminal is a function of the magnitude of direct current disabling voltage applied to said chroma channel means, said pulses being applied with such eletcrical sense and amplitude that the keying pulses applied to said disabling terminal during disablement of said chroma channel means are sufficient to cause enablement of said chroma channel means during the intervals defined by said keying pulses.

12. In a color television receiver for receiving and demodulating a color television signal having a burst component and a chrominance component, the combination of: means for receiving broadcast television signals of the type described; a chrominance amplifier operatively coupled with said receiving means for amplifying signal frequencies corresponding to the burst and chrominance components of received color television signals; means operatively coupled to the output of said chrominance amplifier for separating the burst component of received color television signals; means operatively coupled with said burst component separating means for establishing a controllable threshold therein defining the amplitude of received burst component below which said burst separataing means will deliver no separated burst component, said controllable threshold establishing means including therein means for controlling said threshold as a function of a control voltage; means operatively coupled in said receiver for developing a control voltage which is a function of the amplitude of received burst component; and means operatively coupling said last named means with threshold control means for controlling the burst component separating threshold of said burst component threshold separating means as a function of the amplitude of the received burst component.

13. In a color television receiver for receiving, demodulating and transducing a compatible color television signal into a visible color television image, said signal including a chrominance component and a periodically recurrent burst component, the combination of: means for receiving broadcast color television signals of the type described; a chrominance amplifier means operatively coupled with said receiving means for amplifying signal frequencies corresponding to the burst and chrominance components of received color television signals, said amplifier being adapted to accept an automatic chroma control signal for gain control thereof; means operatively coupled with the output of said amplifier for developing a direct current automatic chroma control voltage depicting the amplitude of the received burst component over a given range of burst component amplitude level; means operatively applying said automatic chroma control voltage to said chrominance amplifier with such electrical sense as to minimize variations in the amplitude of burst component delivered by said chrominance amplifier; means operatively coupled with said automatic chroma control voltage developing means and responsive to a control potential for defining a burst component amplitude threshold in said receiver such that for amplitudes of received burst below said threshold, said automatic chroma control voltage will no longer be a function of the amplitude of the received burst component; means operatively coupled in said receiver responsive to the presence and absence of burst component in received television signals to develop a threshold control voltage; and means operatively applying said threshold control voltage to said threshold defining means so that during reception of television signals having a burst component, the threshold of automatic chroma control operation is modified over that condition of said receiver in which signals having no burst component are received.

14. In a color television receiver for receiving and displaying both color and monochrome images respectively in response to radio carriers modulated with standard color and standard monochrome type television signals, said color television signal being distinguished from said monochrome television signal by the inclusion therein of a periodically recurrent burst component representing a substantially fixed percentage modulation of the received radio carrier, the combination of: means responsive exclusively to the amplitude of the color burst component of received color television radio carrier signals to develop a conditioning voltage, the magnitude of which is a function of the amplitude of said burst component; a signal transducing system responsive to said conditioning voltage which conditionally displays received television signals in either a color or a monochrome type image; threshold means operatively connected with said conditioning voltage developing means and said transducing means for permitting color image display by said transducing means only upon reception of a burst component having an amplitude in excess of a first amplitude threshold; and means operatively connected with said conditioning voltage developing means and said transducing means for permitting monochrome image display by said transducing means only upon the reception of signals having no burst component of an amplitude above a second amplitude threshold, said second threshold amplitude being established at a substantially smaller value than said first amplitude threshold such that said television receiver is automatically conditioned for color image display only by an amplitude of received burst component which exceeds by a substantial amount that amplitude of received burst component below which said receiver is automatically conditioned for monochrome image display.

15. In a television receiver for color television signals including a recurrent color synchronizing burst component, a chrominance amplifier including an electron tube having a first and second gain controlling electrodes, means for deriving a first control voltage as a function of the amplitude of said color synchronizing burst component, means applying said first control voltage to said first gain controlling electrode to provide automatic chroma control of said chrominance amplifier, means coupled to receive said first control voltage for developing a second control voltage for disabling said chrominance amplifier, and means for applying said second control voltage to said second gain controlling electrode.

16. In a television receiver for monochrome television signals or color television signals characterized by a recurrent color synchronizing burst component, a chrominance amplifier having an output circuit, means coupled to the output circuit of said chrominance amplifier for deriving a control voltage as a function of the amplitude of the color synchronizing burst component appearing in said output circuit, disabling means responsive to said control voltage for inactivating said chrominance amplifier when said control voltage falls below a predetermined threshold level and to condition said chrominance amplifier for normal amplification when said control voltage rises above said threshold level, and means for periodically reactivating said chrominance amplifier from said inactivated condition to produce less than normal amplification for signals applied thereto at time intervals corresponding to the occurrence of said color synchronizing burst component.

17. In a television receiver for color television signals including a chrominance component and recurrent color synchronizing burst component, a chrominance amplifier, color killer means responsive to said color synchronizing burst component connected to disable said chrominance amplifier when said color synchronizing burst component amplitude falls below a first threshold level, and means for disabling said color killer means when said color synchronizing burst component amplitude rises to a second threshold level greater than said first threshold level to enable said chrominance amplifier to amplify the chrominance components of a color television signal applied thereto.

18. In a television receiver for color television signals characterized by a recurrent color synchronizing burst component, a chrominance amplifier having an output circuit, means coupled to the output circuit of said chrominance amplifier for deriving a control voltage as a function of the amplitude of the color synchronizing burst component appearing in said output circuit, color killer means coupled with said chrominance amplifier and said control voltage developing means and operative to inactivate said chrominance amplifier in response to control voltages below a predetermined threshold level, means for periodically activating said chrominance amplifier from said inactivated condition at time intervals corresponding to the occurrence of said color synchronizing burst component to provide lower gain than is obtained when said color killer does not inactivate said chrominance channel.

19. In a television receiver for color television signals characterized by a recurrent color synchronizing burst component, a chrominance amplifier having an output circuit, means coupled to the output circuit of said chrominance amplifier for deriving a control voltage as a function of the amplitude of the color synchronizing burst component appearing in said output circuit, disabling means coupled with said chrominance amplifier and said control voltage deriving means and operative to inactivate said chrominance amplifier when said control voltage falls below a predetermined threshold level, and means for conditioning said disabling means to reactivate said chrominance amplifier for normal gain when said control voltage rises to a second threshold level greater than said first threshold level.

References Cited in the file of this patent

UNITED STATES PATENTS 2,790,846 Keizer ---------------- Apr. 30, 1957

OTHER REFERENCES

Circuit diagram of Philco TV–123, chassis service notes, copyrighted 1955.